(12) United States Patent
Hawes (10) Patent No.: US 7,810,829 B2
(45) Date of Patent: *Oct. 12, 2010

(54) FENDER ASSEMBLY AND ADJUSTABLE MOUNTING BRACKET THEREFOR

(75) Inventor: Timothy R. Hawes, Muskegon, MI (US)

(73) Assignee: Fleet Engineers, Incorporated, Muskegon, MI (US)

( * ) Notice: Subject to any disclaimer, the term of this patent is extended or adjusted under 35 U.S.C. 154(b) by 1654 days.

This patent is subject to a terminal disclaimer.

(21) Appl. No.: 10/064,350

(22) Filed: Jul. 3, 2002

(65) Prior Publication Data

US 2004/0004351 A1    Jan. 8, 2004

(51) Int. Cl.
*B62D 25/18*    (2006.01)
(52) U.S. Cl. ........................................ 280/154
(58) Field of Classification Search ............... 280/847, 280/348, 154, 851, 354, 159, 160; 403/230, 403/231, 256, 61, 75, 104; 248/223.31, 244, 248/647, 670, 220.22, 276.1
See application file for complete search history.

(56) References Cited

U.S. PATENT DOCUMENTS

| 1,094,134 | A | | 4/1914 | Dickerson |
| 1,458,457 | A | | 6/1923 | Amez-Droz |
| 2,920,498 | A | * | 1/1960 | Federn .......................... 74/470 |
| 3,580,604 | A | | 5/1971 | Overend |
| 3,765,636 | A | * | 10/1973 | Burrell et al. ................ 248/313 |
| 4,181,293 | A | * | 1/1980 | Laribee ......................... 256/67 |
| 4,377,294 | A | | 3/1983 | Lockwood |
| 4,406,474 | A | * | 9/1983 | Scharf .......................... 280/154 |
| 4,417,741 | A | * | 11/1983 | Ciocan ......................... 280/851 |
| 4,591,178 | A | | 5/1986 | Mortvedt et al. |
| 5,048,781 | A | * | 9/1991 | Breen ....................... 249/219.1 |
| 5,511,808 | A | * | 4/1996 | Rowland ..................... 280/157 |
| 5,895,064 | A | * | 4/1999 | Laubach ...................... 280/163 |
| 5,950,975 | A | | 9/1999 | Zieske |
| 6,076,842 | A | * | 6/2000 | Knoer .......................... 280/154 |
| 6,273,631 | B1 | * | 8/2001 | Takahashi et al. ........... 403/104 |
| 6,471,228 | B2 | * | 10/2002 | Hawes .......................... 280/154 |
| 6,484,984 | B2 | * | 11/2002 | Hawes .................... 248/220.21 |

FOREIGN PATENT DOCUMENTS

| GB | 1101550 | * | 1/1968 | .................. 280/847 |
| SU | 925727 | * | 5/1982 | .................. 280/847 |

* cited by examiner

*Primary Examiner*—Frank B Vanaman
(74) *Attorney, Agent, or Firm*—McGarry Bair PC (57) ABSTRACT

A fender assembly comprising a fender and an adjustable bracket assembly that is adapted to adjustably mount the fender to the vehicle. The bracket assembly includes an arm with a longitudinal axis offset from and a fastener for rotationally mounting the bracket to a vehicle frame through and adjustable link. A vibration decoupler is mounted between the arm and the fender.

41 Claims, 6 Drawing Sheets

FENDER ASSEMBLY AND ADJUSTABLE MOUNTING BRACKET THEREFOR

BACKGROUND OF INVENTION

1. Field of the Invention

The invention relates to a fender assembly for a heavy-duty vehicle. In one of its aspects, the invention relates to fender assembly that includes an adjustable mounting bracket. In another of its aspects, the invention relates to an adjustable mounting bracket for mounting a fender to a vehicle frame. In another of its aspects, the invention relates to a mounting bracket for mounting a fender toga vehicle wherein the mounting bracket is adapted to mount above or below the fender and is also adapted to mount anywhere along the fender.

2. Description of the Related Art

Heavy-duty vehicles, such as a semi-tractor, use fender assemblies to cover the otherwise exposed drive wheels of the tractor. Many fender assemblies are adjustable to accommodate the various semi-tractor configurations and fender types. A common approach for accomplishing the adjustability of the fender assembly is to provide the assembly with an adjustable mounting bracket, which mounts the fender to the vehicle frame in a manner to permit the movement of the fender relative to the vehicle frame and wheels.

Prior mounting brackets comprise an elongated arm that is connected to and laterally offset from a rotationally adjustable mount. The elongated arm extends generally laterally from the vehicle and mounts a portion of the fender. The rotationally adjustable mount is secured to the vehicle frame. The relative position of the fender to the vehicle and wheels can be adjusted by rotating the rotationally adjustable mount to change the orientation of the elongated arm by moving the arm along an arc whose center point is the axis of rotation of the adjustable mount. The arc defines the limited range of motion or adjustability for the bracket. Thus, the rotation of the adjustable mount simultaneously changes both the fore/aft position of the arm relative to the vehicle and the height of the arm relative to the ground. The arc is dictated by the offset distance.

The arm and mount can be separate pieces or formed as a single piece. The rotatable mount can comprise a tube that receives a bolt secured to the frame by a nut. The mount can be rotated by loosening the nut and rotating the tube and re-tightening the nut.

One disadvantage of the prior mounting brackets is that the range of motion defined by the arc for a given offset may not work for all combinations of fenders and semi-tractors since there are a variety of different shapes and styles of fenders, and different semi-tractors have different amounts of space in which the fender can be placed. Typically, different mounting brackets may be required to mount different parts of the fender to a vehicle frame.

It is desirable to have a mounting bracket assembly that has an adjustable offset to provide for multiple range-of-motion arcs and thereby accommodate many more combinations of fenders and semi-tractors with a single bracket.

SUMMARY OF INVENTION

The invention relates to a fender assembly for a vehicle having a longitudinal frame supported by carrying ground-engaging wheels positioned laterally of the frame. The fender assembly comprises a fender of a relatively linear cross dimension adapted to overlie at least one of the wheels and having an upper surface and a lower surface. An elongated support arm is mounted to either of the upper or lower surfaces of the fender and have a longitudinal axis. A bracket assembly is mounted to the support arm and has a connector for mounting the bracket assembly to the vehicle frame for rotation about axis of rotation substantially parallel to and spaced from the longitudinal axis of the elongated support arm to define an offset distance therebetween. According to the invention, The connector includes a length-adjustable link to selectively adjust the offset distance between the longitudinal axis of the elongated support arm and the axis of rotation of the bracket assembly.

The length-adjustable link in a preferred embodiment comprises a first bracket mounted to the support arm, a second bracket coupled to the connector, and the first and second brackets are coupled together for relative movement therebetween. A releasable fastener extends through the first and second brackets such that when the releasable fastener is in an unreleased condition, the relative position of the first and second brackets is fixed, and when the releasable fastener is in a released condition, the first and second brackets are adjustable relative to each other. Preferably, the releasable fastener comprises a bolt that extends through aligned openings in the first and second brackets and a nut threadably mounted on the bolt, wherein the bolt is tightened to place the fastener in the unreleased condition, and the bolt is loosened place the fastener in the released condition.

The invention further relates to a fender mounting bracket assembly for a vehicle with a longitudinal frame that carries ground engaging wheels above which is supported a fender. The fender mounting assembly comprising an elongated support arm adapted to be mounted to either of an upper or lower surface of the fender and defining a longitudinal axis. According to the invention a length-adjustable link connection has a first portion connected to the elongated support arm and a second portion adapted to be rotatably mounted to a vehicle frame at a rotational axis spaced from the longitudinal axis of the elongated arm. Adjusting the length of the link can thus change the offset spacing between the arm longitudinal axis and the rotational axis.

The length-adjustable link in a preferred embodiment comprises a first bracket mounted to the support arm, a second bracket coupled to a connector, and the first and second brackets are coupled together for relative movement therebetween. A releasable fastener extends through the first and second brackets such that when the releasable fastener is in an unreleased condition, the relative position of the first and second brackets is fixed, and when the releasable fastener is in a released condition, the first and second brackets are adjustable relative to each other. Preferably, the releasable fastener comprises a bolt that extends through aligned openings in the first and second brackets and a nut threadably mounted on the bolt, wherein the bolt is tightened to place the fastener in the unreleased condition, and the bolt is loosened place the fastener in the released condition.

DETAILED DESCRIPTION

Figure 1:
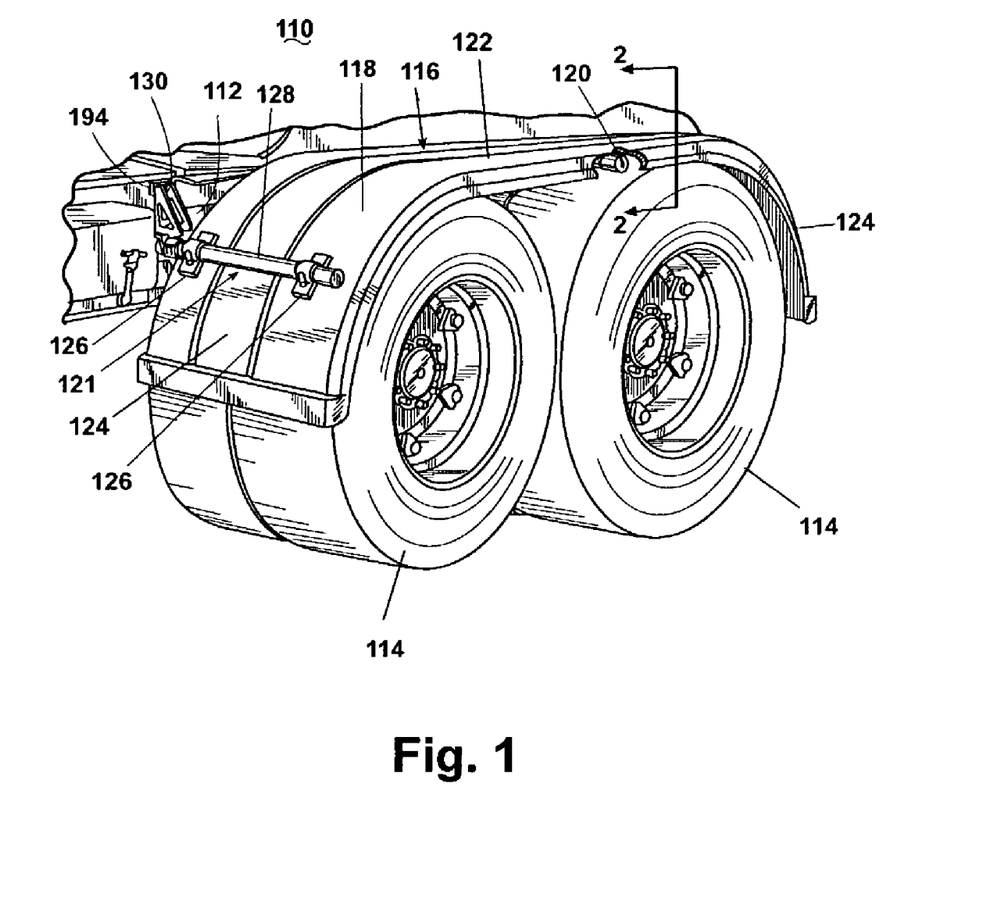
FIG. 1 is a perspective view of a portion of a semi-tractor incorporating a fender assembly bracket according to the invention and comprising a decoupler mounting the fender to an arm that is supported a mounting bracket assembly comprising an adjustment bracket and a mounting bracket connected to the vehicle, which permits the adjustment of the offset between the arm and the mounting bracket.

Referring now to the drawings, and FIG. 1 in particular, a portion of a heavy-duty vehicle in the form of a semi-tractor 110 has a frame 112 to which are rotatably mounted, ground engaging wheels 114. A fender assembly 116 according to the invention is mounted to the semi-tractor frame 112 and comprises a fender 118 and a bottom-mount bracket assembly 120 and a top mount bracket assembly 121. The bracket assemblies 120,121 adjustably mount the fender 118 to the vehicle frame 112 such that the fender 118 can be moved relative to the frame 112. The fender 118 includes a generally planar portion 122 that terminates in downwardly curved arcuate ends 124.

The top-mount bracket assembly 121 is preferably used to mount the fender arcuate ends 124 to the vehicle frame by suspending the fender from the bracket assembly 121. The bottom-mount bracket assembly 120 is preferably located between the wheels and supports the center of the fender 118. Thus, the top-mount bracket assembly must generally accommodate mostly tensile loads, whereas the bottom-mount bracket must accommodate mostly compressive loads.

Figure 2:
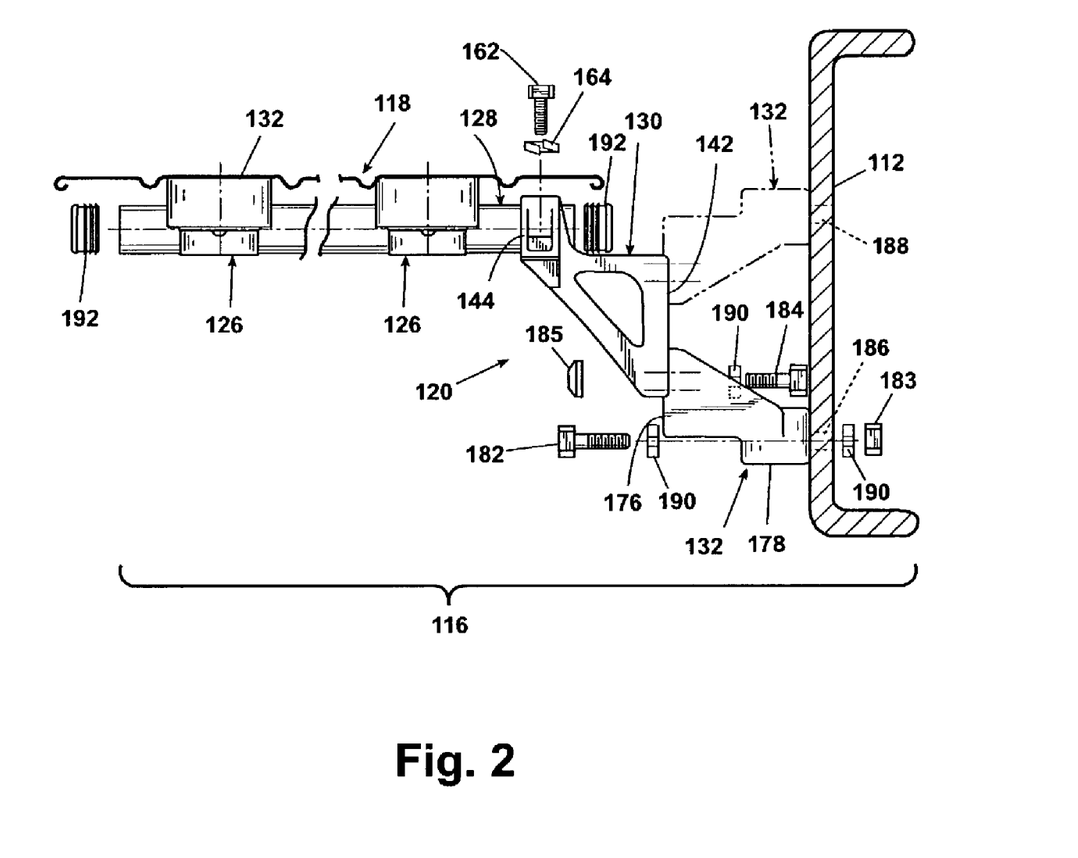
FIG. 2 is a partially exploded sectional view taken along line 2-2 of FIG. 1 and illustrating a bottom-mount bracket assembly.

Referring the FIG. 2, the bottom-mount fender bracket assembly 120 comprises vibration decoupling connectors or decouplers 126 and an arm in the form of a shaft 128, which has a longitudinal axis extending along the longitudinal centerline of the shaft and is connected to an adjustment bracket 130 which is movably mounted to the vehicle frame 112 through a mounting bracket 132. The mounting bracket 132, which is rotatably mounted through a bolt 182 to the vehicle frame 112, mounts the adjustment bracket 130 for vertical adjustment with respect to the mounting bracket through a second bolt 184. The adjustment bracket 130 and mounting bracket 132 collectively form a length-adjustable link that is rotatably coupled to the vehicle frame.

The decouplers 126 are preferably one of the block decouplers described in US 2002/0024213 A1, whose disclosure has been incorporated by reference and will not be described in further detail. The shaft 128 is preferably a tube and is made from a suitable non-corrosive metal. An alternative location for the mounting bracket 132 is shown in phantom lines in FIG. 2.

A vibration-resistant lock washer 164 is used in combination with the bolt 162.

The lock washer aids in preventing the bolt from loosening because of the vibration forces acting on the mounting bracket assembly 120.

Figure 3:
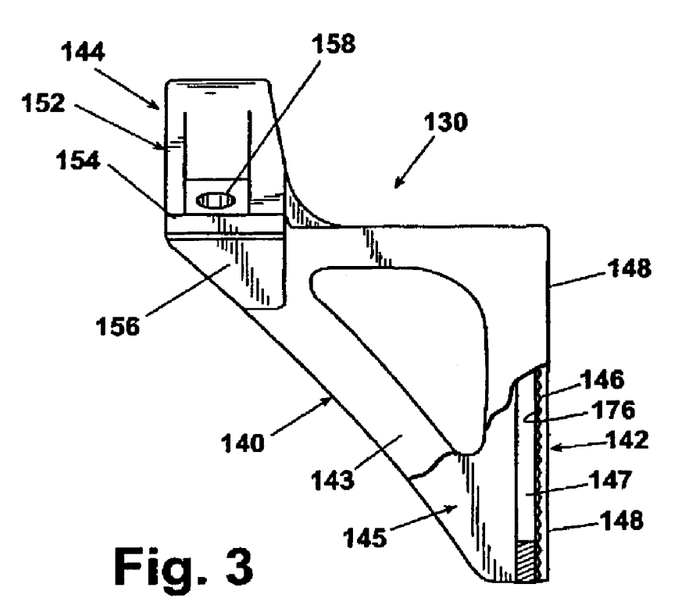
FIG. 3 is an enlarged side view of the adjustment bracket.

Referring to FIGS. 2 and 3, the adjustment bracket 130 comprises a triangular body 140 having an adjustable mount 142 on one side and an adjustable shaft mount 144 on another side. A pair of spaced gussets 143 extend from the adjustable mount 142 and the shaft mount 144 to form the long side of the triangular body and define a channel 145 therebetween that terminates at the adjustable mount 142.

Figure 4:
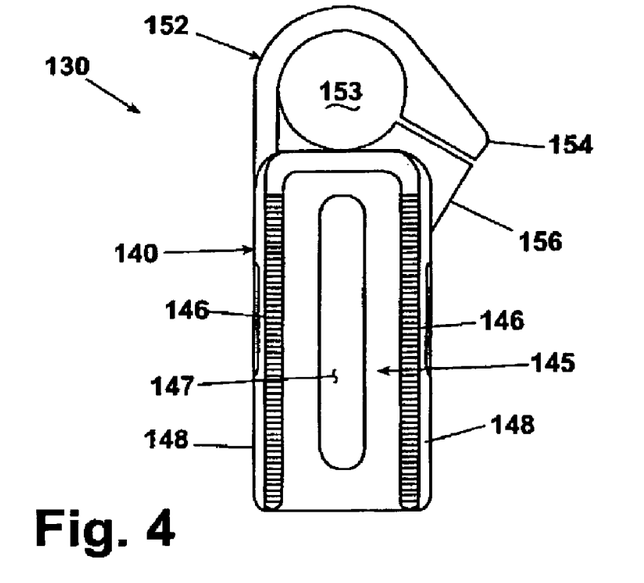
FIG. 4 is a right-side end view of the adjustment bracket illustrated in FIG. 3.

Referring to FIGS. 3 and 4, the adjustable mount 142 comprises a serrated surface 146 formed by multiple teeth arranged in spaced pairs and between which is formed an ovate opening 147. The serrations 146 extend away from the body 140 and are disposed between guide edges 148, which extend away from the body 140 a distance greater than the extent of the serrations 146. The spaced guide edges 148 effectively define a channel in which the serrations 146 are positioned. The guide edges 148 aid in the positioning and retention of a portion of the mounting bracket 132 therein.

The rotatably adjustable shaft mount 144 comprises a split ring 152 that defines a through opening 153. The split ring 152 has a clamping tab 154 that overlies an embossment 156 extending from the body. The clamping tab 154 has a through opening 158 and the embossment 156 has a tapped blind opening (not shown) in axial alignment with the through opening 158. A threaded bolt 162 (FIG. 2) is received in the opening 158 and threaded into the blind opening to tighten the clamping tab 154 against the embossment 156 and thus to clamp a portion of the shaft 128. The position of the shaft 128 relative to the adjustment bracket 130 can be both rotatably adjusted and laterally adjusted (as seen from FIG. 2) by loosening the bolt to unclamp the shaft 128, moving the shaft to the desired position and then re-clamping by tightening the bolt 162.

A vibration-resistant lock washer 164 is used in combination with the bolt 162. The lock washer aids in preventing the bolt from loosening because of the vibration forces acting on the mounting bracket assembly 120.

Figure 5:
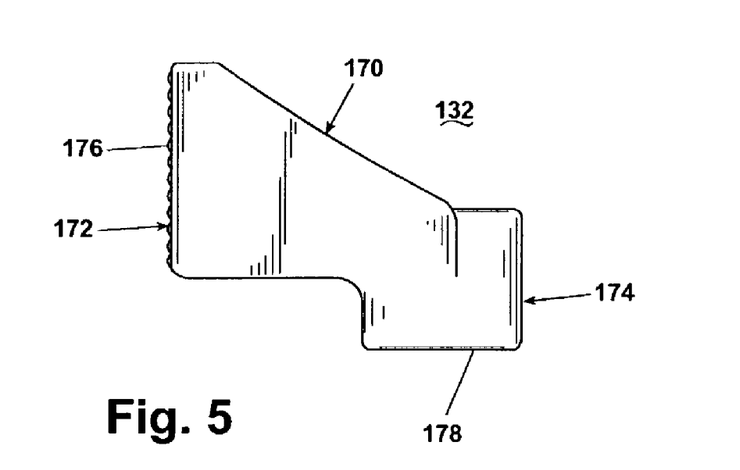
FIG. 5 is an enlarged side view of the mounting bracket illustrated in FIGS. 1 and 2.
Figure 6:
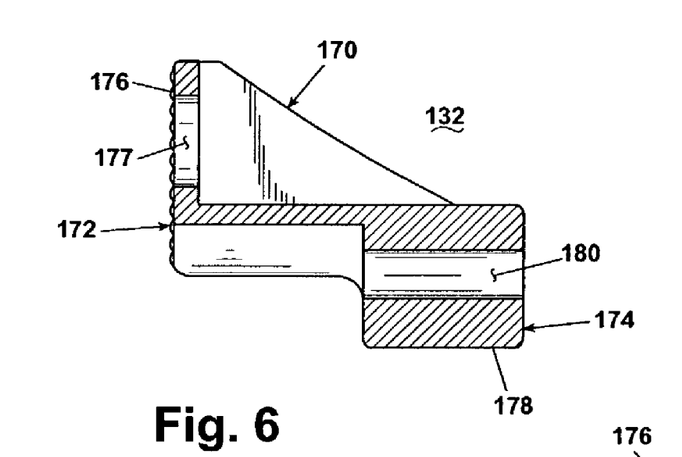
FIG. 6 is a longitudinal sectional view of the mounting bracket of FIG. 5.
Figure 7:
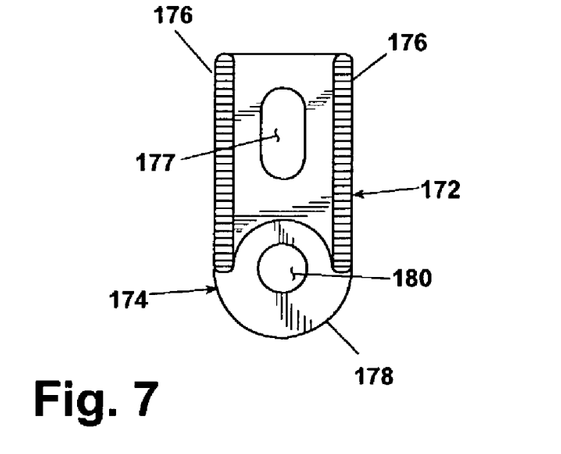
FIG. 7 is a left-side end view of the mounting bracket illustrated in FIG. 6.

Referring to FIGS. 5-7, the mounting bracket 132 comprises a generally triangular body 170 having an adjustable mount 172 on one side of the triangular body and a rotational mount 174 on another side of the triangular body 170. The rotational mount 174 in combination with the fastener formed by the bolt 182 and nut 183 forms a rotatable mount for coupling the bracket assembly 120 to the vehicle frame. The axis of rotation for the rotatable mount lies along the longitudinal centerline of the bolt 182.

The adjustable mount 172 is complementary to the adjustable mount 142 on the adjustment bracket 130. The adjustable mount 172 comprises serrations 176, preferably formed by adjacent teeth arranged in two parallel and spaced columns, which span a width less than the distance between the guide edges 148 and equal to the spacing of the serrations 146.

The teeth forming the serrations 146 and 176 define a recesses between adjacent teeth. When the adjustment bracket 130 and mounting bracket 132 are coupled together, the teeth of the adjustment bracket 130 and mounting bracket 132 are received within the recesses of the other of the adjustment bracket 130 and mounting bracket 132. Preferably, the teeth are sized such that the relative movement of the adjustment bracket 130 and mounting bracket 132 for each tooth results in a quarter-inch relative movement between the adjustment bracket 130 and mounting bracket 132 along the plane defined by the serrations. The sides of the mounting bracket 132 at the serrations 176 fit between the guide edges 148 to restrict sideways movement of the adjustment bracket 130 with respect to the mounting bracket 132. An ovate opening 177 is formed between the serrations 176 and which is at least partially aligned with corresponding opening 147 on the adjustment bracket 130 when the mounting bracket assembly 120 is assembled. The rotational mount 174 comprises a cylindrical embossment 178 that extends partially from the triangular body 170 and defines a through opening 180. The through opening is sized to receive a fastener, such as bolt 182 and corresponding nut 183 to mount the mounting bracket 132 to the vehicle frame as noted in FIG. 3. In this manner, the bolt can be loosened to permit the rotational adjustment of the mounting bracket 132 to the vehicle frame and then tightened to fix the rotational position of the mounting 132 relative to the vehicle frame.

Although the through opening 180 is illustrated as being unthreaded, the through opening 180 can be threaded if desired, depending upon the type of fastener.

Figure 8:
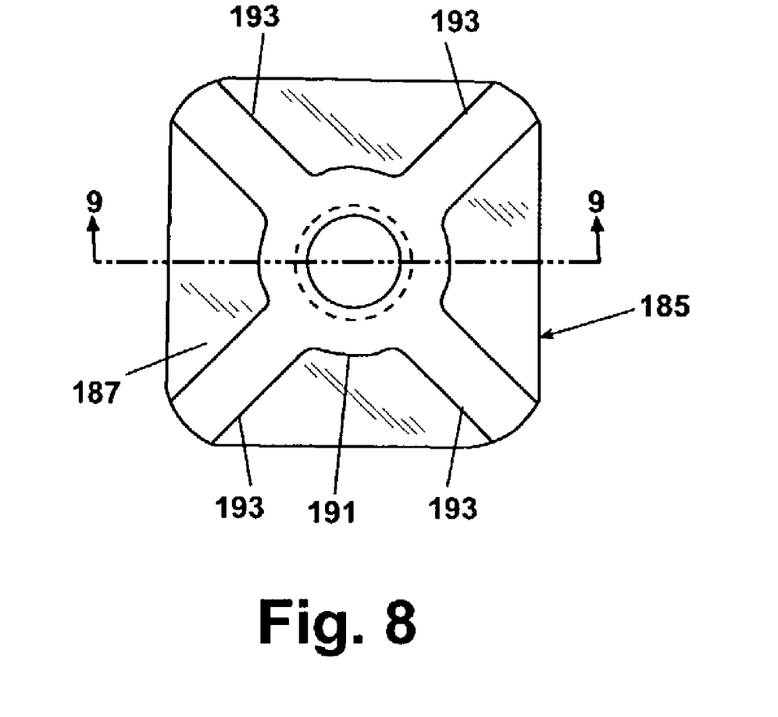
FIG. 8 is a left-side end view of a mounting nut for securing the adjustment bracket to the mounting bracket.
Figure 9:
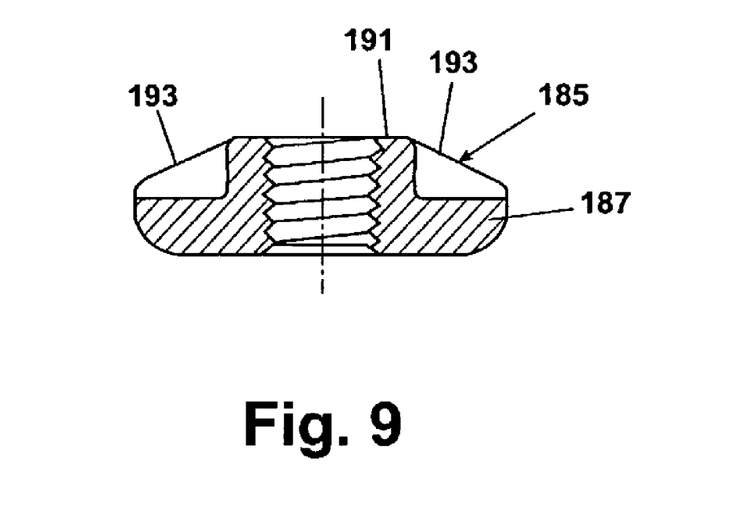
FIG. 9 is a sectional view of the mounting nut taken along line 9-9 of FIG. 8.

Referring to FIGS. 2 and 8-9, a threaded bolt 184, nut 185 and washer 190 mount the mounting bracket 132 to the adjustment bracket 130. The washer 190 is carried by the bolt 184, which extends through the aligned ovate openings 147 and 177. The nut 185 preferably comprises a square head 187 from surrounding a threaded collar 191. The width of the head 187 is slightly less than the width of the channel 145 formed by the gussets 143 to prevent the rotation of the nut 185 within the channel 145.

The area of the head 187 contacting the adjustable mount 142 is preferably greater than the cross-sectional area of the bolt 184 to disperse the load carried by the bolt 184 over a greater area of the adjustable mount 142. It is preferred that the head cross-sectional area is multiple times greater than the bolt cross-sectional area.

To mount the fender 118 to the vehicle frame 112, the fender is secured to the shaft 128 through the decouplers 126. The inboard end of the shaft 128 is then received within the split ring opening 153, positioned both laterally and rotationally as desired, and then the bolt 162 is tightened to fix the relative position of the shaft 128 and the adjustment bracket 130. Plugs 192 can be inserted into one or both of the ends of the shaft 128 to seal the interior of the shaft from the environment.

The adjustment bracket 130 is then mounted to the mounting bracket 132 by inserting the adjustable mount 172 of the mounting bracket 132 between the guide edges 148 of the adjustment bracket 130 so that the serrations 176 mesh with the serrations 146. If needed, the relative positions of the adjustment bracket 130 and mounting bracket 132 can be adjusted by moving the serrations relative to each Once the desired position of the adjustment bracket 130 and mounting bracket 132 is reached, the nut 185 is positioned within the channel 145 and bolt 184, carrying washer 190, is passed through the aligned openings 147 and 177 and threaded into the nut 185. As the bolt 184 is tightened to compressively retain the adjustment bracket 130 to the mounting bracket 132, the serrations 146, 176 seat relative to each other.

To complete the assembly of the fender to the vehicle frame, the mounting bracket 132 is then mounted to the vehicle frame by passing the bolt 182 through the through opening 180 into a corresponding opening in the vehicle frame where the nut 183 is placed on the bolt and tightened to compressively retain the mounting bracket 132 to the vehicle frame. The rotational position of the mounting bracket can be adjusted prior to tightening of the fastener.

It should be noted that the particular assembly sequence of the fender bracket assembly components (decouplers 126, shaft 128, adjustment bracket 130, and mounting bracket 132) need not necessarily occur in the same sequence as described above. Any sequence of assembly is within the scope of the invention. For example, in some situations, the technician may find it more convenient to assemble the decouplers 126 and shaft 128 to the fender 118, then assemble the adjustment bracket 130 and mounting bracket 132 to the vehicle frame 112, and then mount the fender to the assembled adjustment bracket and mounting bracket.

It should further be noted that the final orientation of the fender bracket assembly components need not necessarily be fixed upon the initial assembly. It is anticipated that the technician will make final or fine tuning adjustments between the fender 118 and decouplers 126. The decouplers 126 and the shaft.128, the shaft 128 and the adjustment bracket 130, the adjustment bracket 130 and the mounting bracket 132, and finally, the mounting bracket 132 and the vehicle frame 112, to obtain the exact desired positioning of the fender relative to the vehicle frame after the initial fixing of the fender to the frame.

Figure 10:
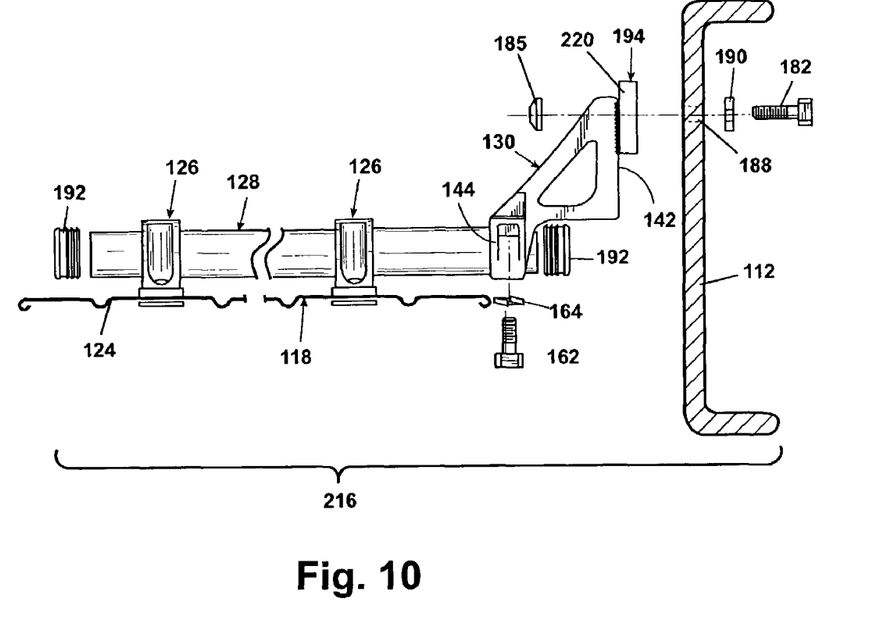
FIG. 10 is a partially exploded sectional view similar to FIG. 2 but illustrating a bottom-mount bracket assembly.
Figure 11:
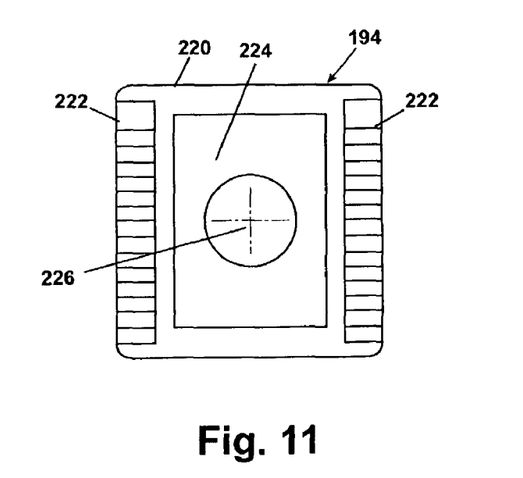
FIG. 11 is a left-side end view of the top-mount bracket assembly illustrated in FIG. 10.

FIGS. 10 and 11 disclose a top-mount fender bracket assembly 216. Since the bottom-mount fender bracket assembly 216 is substantially identical to the bottom-mount fender bracket assembly except for an alternative mounting bracket 194, only the alternative mounting bracket 194 will be described in detail.

The mounting bracket 194 comprises a plate 220 having a pair of spaced serrations 222 extending from one side of the plate. A raised platform 224 is located between the spaced serrations 222. A through opening 226 extends through the platform 224. The platform is a support spacer so mount 142 will not be distorted when tightening bolt 182.

When the mounting bracket 194 is mated with the adjustment bracket 130, the serrations mesh and the platform 224 lies between the serrations 176 of the adjustment bracket 130. The platform 224 has a width slightly less than the gap between the serrations 176 and a height slightly less than the height of the teeth of the serrations 176. Thus, the teeth of the serrations 176 and 222 will not enmesh unless the platform is received between the serrations 176. The guide edges 148 align the plate 220 with the adjustment bracket 130 and maintain the serrations 222 in alignment with the serrations 176.

Unlike the mounting bracket 132 of the bottom-mount bracket, the mounting bracket 194 uses the same bolt 184 to both mount the adjustment bracket 130 to the mounting bracket 194 and the mounting bracket 194 to the vehicle. Thus, the longitudinal axis of the bolt 184 defines the axis of rotation. The mounting bracket 194 can be rotated relative to the vehicle like the mounting bracket 132. The mounting bracket 194 does provide for closer spacing of the adjustment bracket 130 to the vehicle.

Since the mounting bracket 194 is shorter than the mounting bracket 132, it is contemplated that the shaft 128 will be longer for the top-mount bracket to compensate for the reduced length of the mounting bracket 194.

Although it is preferred that different bracket assemblies be used for the top and bottom mount, it is within the scope of the invention for the top-mount to be used in place of the bottom-mount and vice-versa. One advantage of the top-mount is that it does not require as much space between the fender and the wheels as does the bottom-mount. However, the bottom-mount is better suited to handle the compressive loads than the top mount.

The invention has many advantages over prior art fender assemblies. One of the advantages is that the mounting bracket permits the adjustment of the offset between the arm and the rotational mounting of the bracket to the vehicle by altering the spatial relationship between the adjustment bracket and the mounting bracket to thereby adjust the length between the axis of rotation and the axis of the shaft. The adjustment of the offset permits the installer to select the arc through which the arm will traverse upon rotation of the mounting bracket. For a given rotation, the greater the offset, the greater will be the fore/aft and vertical movement of the arm relative to the vehicle. Conversely, the less the offset, the less will be the fore/aft and vertical movement of the arm relative to the vehicle.

Another advantage of the invention lies in the ease of adjusting the offset, which can be accomplished without disassembling the mounting bracket assembly. The bolt only need be loosened a sufficient amount to permit the release of the serrations, such that the adjustment bracket can be slid relative to the mounting bracket. The bolt will still be coupled to the nut, which collectively will loosely couple the adjustment bracket and the mounting bracket, which greatly aids the installer since the adjustment bracket and mounting bracket are relatively heavy and large, making it difficult or awkward for a single person to otherwise adjust.

The shape of the nut 185 also simplifies the adjustment of the offset. Since the nut 185 is shaped to prevent rotation when the nut is received within the channel 145, the installer need not be concerned with the "free-spinning" of the nut 185 while rotating the bolt 184. The fender shape is such that it can prevent one person from being positioned such that he can both tighten the bolt 184 and hold the nut 185. The shape of the nut 185 reduces the likelihood that a second installer will be needed when tightening the bolt 184.

Another advantage is that the mounting bracket can be "flipped" as shown in phantom in FIG. 2, which provides for the adjustment bracket to be supported or suspended from the mounting bracket to further increase the mounting flexibility of the mounting bracket assembly.

While the invention has been specifically described in connection with certain specific embodiments thereof, it is to be understood that this is by way of illustration and not of limitation. Reasonable variation and modification are possible within the scope of the disclosure and drawings without departing from the spirit of the invention.

The invention claimed is:

1. A fender assembly for a vehicle comprising a longitudinal frame and carrying ground-engaging wheels supporting the frame above a road surface and positioned laterally of the frame, the fender assembly comprising:
    a fender of a relatively linear cross dimension adapted to overlie at least one of the wheels and having an upper surface and a lower surface;
    an elongated support arm mounted to either of the upper or lower surfaces of the fender and having a longitudinal axis;
    a bracket assembly mounted to the support arm and having a connector for mounting the bracket assembly to the vehicle frame for rotation about an axis of rotation substantially parallel to and spaced from the longitudinal axis of the elongated support arm to define an offset distance therebetween; and
    the bracket assembly further including a length-adjustable link to selectively adjust the offset distance between the longitudinal axis of the elongated support arm and the axis of rotation of the bracket assembly.

2. The fender assembly according to claim 1 wherein the length-adjustable link comprises a first bracket mounted to the support arm, a second bracket coupled to the connector, and the first and second brackets are coupled together for relative vertical movement therebetween.

3. The fender assembly according to claim 2 and further comprising a releasable fastener extending through the first and second brackets such that when the releasable fastener is in an unreleased condition, the relative position of the first and second brackets is fixed, and when the releasable fastener is in a released condition, the first and second brackets are adjustable relative to each other.

4. The fender assembly according to claim 3 wherein the releasable fastener comprises a bolt extending through aligned first and second openings in the first and second brackets, respectively, and a nut threadably mounted on the bolt, wherein the bolt is tightened to place the fastener in the unreleased condition, and the bolt is loosened to place the fastener in the released condition.

5. The fender assembly according to claim 4 wherein the nut comprises a base that abuts the first bracket when the fastener is in the unreleased condition.

6. The fender assembly according to claim 5 wherein the first bracket comprises flanges defining a channel therebetween and the base width is substantially equal to the channel width.

7. The fender assembly according to claim 6 wherein the base has linear edges that interface with the channel flanges to restrain relative rotation of the nut with respect to the first bracket.

8. The fender assembly according to claim 7 wherein the area of the base abutting the first bracket is at least twice as great as the cross-sectional area of the bolt.

9. The fender assembly according to claim 7 wherein the base is rectangular.

10. The fender assembly according to claim 9 wherein the nut further comprises a collar extending from the base and defining a threaded opening within the collar.

11. The fender assembly according to claim 10 wherein the nut further comprises gussets extending between the collar and the base.

12. The fender assembly according to claim 4 wherein at least one of the aligned first and second openings is a slot.

13. The fender assembly according to claim 12 wherein both aligned first and second openings are slots.

14. The fender assembly according to claim 4 wherein the first and second brackets each have a face with a serration and the serrations mesh when the fastener is in the unreleased position.

15. The fender assembly according to claim 14 wherein a pair of spaced, parallel serrations is provided on both faces.

16. The fender assembly according to claim 15 wherein the first and second openings lie between the parallel serrations.

17. The fender assembly according to claim 16 wherein the second bracket further comprises a platform that acts as a support when in the unreleased position.

18. The fender assembly according to claim 4 wherein the second bracket comprises a substantially flat plate having opposing faces through which the second opening passes.

19. The fender assembly according to claim 18 wherein one of the faces of the flat plate is adapted to abut the vehicle frame and the fastener extends through the frame and the aligned first and second openings of the first and second brackets wherein the release of the fastener permits the rotation of at least the first bracket relative to the vehicle frame.

20. The fender assembly according to claim 4 and further comprising a second fastener and the second bracket has a third opening that receives the second fastener, wherein the second fastener is adapted to pass through the vehicle frame and into the third opening to form the rotatable mount.

21. The fender assembly according to claim 20 wherein the second bracket comprises a collar in which is formed the third opening and an end plate connected to the collar and in which is formed the second opening.

22. The fender assembly according to claim 21 wherein the second bracket further comprises a gusset connecting the end plate to the collar.

23. The fender assembly according to claim 22 wherein the end plate is spaced from the collar.

24. The fender assembly according to claim 4 wherein the first bracket comprises a releasable mount for rotatably mounting the elongated support arm thereto.

25. The fender assembly according to claim 24 wherein the releasable mount is a ring clamp defining an arm opening in which the arm is received.

26. The fender assembly according to claim 25 wherein the ring clamp arm opening and the arm have complementary circular cross sections such that the arm can be rotated within the arm opening when the ring clamp is unclamped and is rotationally fixed when the ring clamp is clamped.

27. The fender assembly according to claim 24 wherein the first bracket further comprises an end plate connected to the rotatable mount and in which is formed the first opening.

28. The fender assembly according to claim 27 wherein the first bracket further comprises a pair of spaced gussets connecting the end plate and the rotatable mount and defining a channel therebetween in which the nut is received.

29. The fender assembly according to claim 1 and further comprising at least one vibration-decoupling connector connecting the support arm to the fender.

30. A fender mounting bracket for a vehicle comprising a longitudinal frame that carries ground engaging wheels above which is supported a fender, the fender mounting assembly comprising:
   an elongated support arm adapted to be mounted to either of an upper or lower surface of the fender and defining a longitudinal axis;
   a length-adjustable link connection having a first portion connected to the elongated support arm and a second portion adapted to be rotatably mounted to a vehicle frame at a rotational axis spaced from the longitudinal axis of the elongated arm, wherein the offset spacing between the arm longitudinal axis and the rotational axis can be changed by adjusting the length of the link;
   wherein the first portion comprises a first bracket mounted to the support arm and the second portion comprises a second bracket mounted to the first bracket for relative movement therebetween;
   a releasable fastener extending through first and second openings in the first and second brackets, respectively, such that when the releasable fastener is in an unreleased condition, the relative position of the first and second brackets is fixed, and when the releasable fastener is in a released condition, the first and second brackets are selectively adjustable relative to each other;
   wherein the first and second brackets each have a face with a serration and the serrations mesh when the fastener is in the unreleased position;
   wherein a pair of spaced, parallel serrations is provided on both faces;
   wherein the first and second openings lie between the parallel serrations;
   wherein the second bracket comprises a collar in which is formed the third opening and an end plate is connected to the collar, and one side of the end plate forms the corresponding face on which the corresponding serrations are located;
   wherein the second bracket further comprises a gusset connecting the end plate to the collar; and
   wherein the end plate is spaced from the collar.

31. The fender mounting bracket according to claim 30 wherein the first bracket comprises a releasable mount for rotatably mounting the arm thereto.

32. The fender mounting bracket according to claim 31 wherein the releasable mount is a ring clamp defining an arm opening in which the arm is received.

33. The fender mounting bracket according to claim 32 wherein the ring clamp arm opening and the arm have complementary circular cross sections such that the arm can be rotated within the opening when the ring clamp is unclamped and is rotationally fixed when the ring clamp is clamped.

34. The fender mounting bracket according to claim 31 wherein the first bracket further comprises an end plate connected to the rotatable mount and one side of which forms the corresponding face on which the serrations are located and in which is formed the first opening.

35. The fender mounting bracket according to claim 34 wherein the releasable fastener comprises a bolt extending through aligned first and second openings in the first and second brackets, respectively, and a nut threadably mounted on the bolt, wherein the bolt is tightened to place the fastener in the unreleased condition, and the bolt is loosened to place the fastener in the released condition.

36. The fender mounting bracket according to claim 35 wherein the first bracket further comprises a pair of spaced gussets connecting the end plate and the rotatable mount and defining a channel therebetween in which the nut is received.

37. The fender mounting bracket according to claim 36 wherein the nut comprises a base that abuts the first bracket when the fastener is in the unreleased condition.

38. The fender mounting bracket according to claim 37 wherein the base has linear edges that interface with the spaced gussets to restrain rotational motion of the nut with respect to the first bracket.

39. The fender mounting bracket according to claim 38 wherein a width of the base abutting the first bracket is at least twice as great as a cross-sectional area of the bolt.

40. The fender mounting bracket according to claim 39 wherein the base is of a width substantially equal to the width of the channel.

41. The fender mounting bracket according to claim 40 wherein the base is rectangular.

* * * * *